United States Patent
Jin et al.

(10) Patent No.: US 10,507,619 B2
(45) Date of Patent: Dec. 17, 2019

(54) LAMINATOR

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Xuequan Jin, Beijing (CN); Yachao Tong, Beijing (CN); Linlin Wang, Beijing (CN); Gu Yao, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 71 days.

(21) Appl. No.: 15/824,859

(22) Filed: Nov. 28, 2017

(65) Prior Publication Data
US 2018/0281376 A1    Oct. 4, 2018

(30) Foreign Application Priority Data
Mar. 29, 2017   (CN) .................... 2017 2 0319007 U

(51) Int. Cl.
| | | |
|---|---|---|
| *B29C 65/78* | (2006.01) | |
| *B32B 37/18* | (2006.01) | |
| *B32B 17/10* | (2006.01) | |
| *B32B 37/10* | (2006.01) | |
| *B32B 38/00* | (2006.01) | |
| *B32B 37/00* | (2006.01) | |

(52) U.S. Cl.
CPC .... *B29C 65/7847* (2013.01); *B32B 17/10871* (2013.01); *B32B 37/1018* (2013.01); *B32B 37/185* (2013.01); *B32B 37/0053* (2013.01); *B32B 38/0004* (2013.01)

(58) Field of Classification Search
CPC ............ B32B 37/0046; B32B 37/0053; B32B 37/1018; B32B 38/1858; B32B 2037/1081; B29C 65/7847; B29C 65/785; B25B 11/005
USPC ............................................ 156/285; 269/21
See application file for complete search history.

(56) References Cited

U.S. PATENT DOCUMENTS

| | | | | |
|---|---|---|---|---|
| 5,637,177 A | * | 6/1997 | Os ........................ | B29O 66/342 100/156 |
| 6,095,506 A | * | 8/2000 | Schmalz ............... | B25B 11/005 269/21 |

(Continued)

FOREIGN PATENT DOCUMENTS

CN    104360507 A  *  2/2015 ........... G02F 1/1303

OTHER PUBLICATIONS

Yaskawa "Upgrading from Stepper to Servo" Nov. 2011.*

*Primary Examiner* — John L Goff, II
(74) *Attorney, Agent, or Firm* — McDermott Will & Emery LLP

(57) ABSTRACT

A laminator includes a turnover abutment and a film laminating device. The turnover abutment includes a first surface and a second surface opposite to each other, and at least one of the first surface and the second surface is a bearing surface on which a plurality of suction structures are provided. The plurality of suction structures are used for sucking a borne object onto the bearing surface. The film laminating device is configured to laminate a film on the borne object on the bearing surface.

11 Claims, 2 Drawing Sheets

(56) References Cited

U.S. PATENT DOCUMENTS

| | | | | |
|---|---|---|---|---|
| 6,821,176 B2* | 11/2004 | Lee | ............... | H01L 21/67092 |
| | | | | 349/149 |
| 2014/0113394 A1* | 4/2014 | Kim | ............... | H01L 51/56 |
| | | | | 438/28 |
| 2016/0139438 A1* | 5/2016 | Jing | ............... | G02F 1/1303 |
| | | | | 445/24 |

* cited by examiner ued States Patent

LAMINATOR

CROSS-REFERENCE TO RELATED APPLICATION

This application claims benefits and priority to Chinese Patent Application No. 201720319007.9, filed on Mar. 29, 2017, titled "LAMINATOR", which is incorporated herein by reference in its entirety.

TECHNICAL FIELD

The present disclosure relates to a technical field of packaging and in particular to a laminator.

BACKGROUND

A laminator is used for sticking a film onto an object in some processes, for example, sticking a film onto a substrate in an OLED metal packaging process.

SUMMARY

A laminator is provided, including: a turnover abutment, the turnover abutment comprising a first surface and a second surface opposite to each other, at least one of the first surface and the second surface being a bearing surface on which a plurality of suction structures are provided, the plurality of suction structures being used for sucking a borne object onto the bearing surface; and, a film laminating device, which is configured to laminate a film onto the borne object on the bearing surface.

Optionally, both of the first surface and the second surface are bearing surfaces.

Optionally, a mounting chamber running through the two bearing surfaces is provided within the turnover abutment; a support member is provided within the mounting chamber; the support member includes a first support portion and a second support portion which are used for supporting two borne objects respectively on the two bearing surfaces in one-to-one correspondence; and, the support member is connected to a first servo motor for driving the support member to move so that the first support portion and the second support portion can respectively protrude from a corresponding bearing surface of the two bearing surfaces or return back to the mounting chamber.

Optionally, each of the first support portion and the second support portion includes a plurality of support bars parallel to each of the two bearing surfaces, and the plurality of support bars are connected together.

Optionally, the film laminating device includes at least one slide rail, a roller and at least one connector; film material is rolled on the roller; one end of a connector of the at least one connector is rotatably connected to the roller, while the other end thereof is in sliding fit with a corresponding slide rail of the at least one slide rail; as the connector slides within the corresponding slide rail, the roller can roll on the borne object on the bearing surface so that the film material is attached onto the borne object.

Optionally, the at least one slide rail comprises two slide rails which are parallel to each other and arranged on two sides of the turnover abutment, respectively; and, the at least one connector includes two connecting rods, and the two connecting rods connect two ends of the roller to two slide rails in one-to-one correspondence.

Optionally, the laminator further includes a cutting device for cutting the film material.

Optionally, at least one electromagnetic device for generating a magnetic force is provided within the turnover abutment.

Optionally, the at least one electromagnetic device comprises a plurality of electromagnetic devices extending in a direction perpendicular to a spindle of the turnover abutment, and the plurality of electromagnetic devices are uniformly arranged within the turnover abutment in an extension direction of the spindle of the turnover abutment.

Optionally, the turnover abutment is connected to a second driving device for driving the turnover abutment to turn over.

Optionally, the plurality of suction structures are suction holes.

Optionally, the borne object is a substrate.

Optionally, the film material is a packaging film and/or a metal film.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

The technical solutions in embodiments of the present disclosure will be clearly and completely described below with reference to the accompanying drawings in the embodiments of the present disclosure. Apparently, the embodiments described herein are merely a part but not all of the embodiments of the present disclosure. All other embodiments obtained by a person of ordinary skill in the art without paying any creative effort on the basis of the embodiments in the present disclosure shall fall into the protection scope of the present disclosure.

It is to be noted that, in the description of the present disclosure, an orientation or position relation indicated by terms "center", "upper", "lower", "front", "rear", "left", "right", "vertical", "horizontal", "top", "bottom", "inside", "outside" or the like is an orientation or position relation shown based on the accompanying drawings, merely for easily describing the present disclosure and simplifying the description rather than indicating or implying that a specified device or element must have a particular orientation or be constructed and operated in a particular orientation. Therefore, the terms should not be interpreted as limitations to the present disclosure.

Terms "first" and "second" are merely for illustrative purpose, and should not be interpreted as indicating or implying the relative importance or implicitly indicating the number of the specified technical features. Therefore, features defined by the terms "first" and "second" can explicitly or implicitly include one or more features. Unless otherwise stated, in the description of the present disclosure, "a plurality of" means two or more.

It is to be noted that, unless otherwise expressly specified and defined, in the description of the present disclosure, terms "mounting", "joint" and "connection" should be interpreted in a broad sense. For example, the connection may be a fixed connection, a detachable connection or an integral connection; or, may be a direct connection or an indirect connection by an intermediate member; or, may be an internal communication between two elements. A person of ordinary skill in the art may understand the specific meanings of the terms in the present disclosure according to specific circumstances.

Usually, a laminator includes an abutment. A lower surface of the abutment is a bearing surface on which a plurality of suction structures are provided. The plurality of suction structures are configured to suck a borne object onto the bearing surface. Then a film is laminated on the borne object.

During the suction of the borne object, since the borne object is sucked from bottom up by the laminator and the borne object may be in an inclined state before being sucked due to various reasons such as the operation of a manipulator, so that the borne object is not sucked by some suction structures of the plurality of suction structures, thereby resulting in a falling-off risk.

Figure 1:
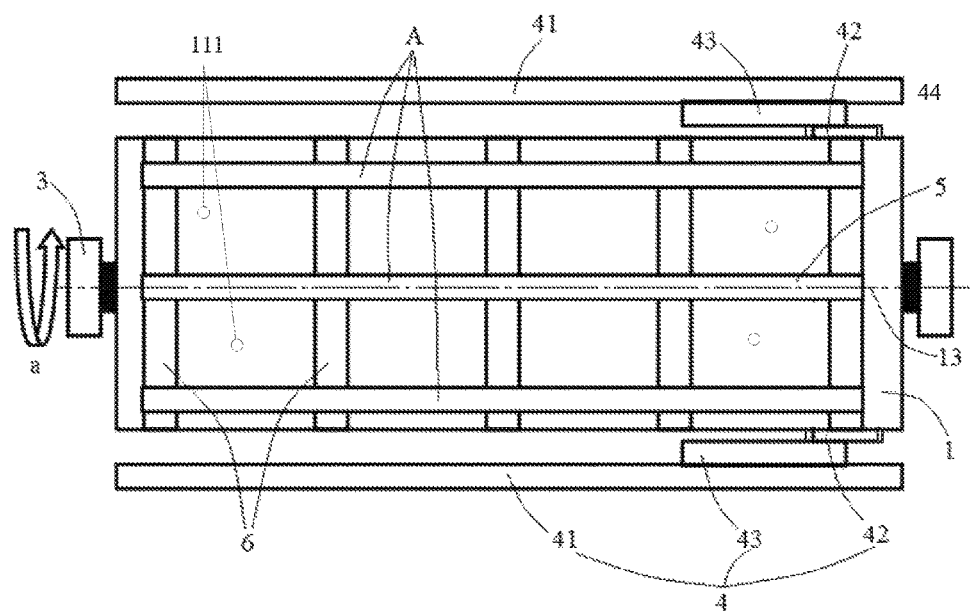
FIG. 1 is a top view of a laminator according to an embodiment of the present disclosure.
Figure 2:
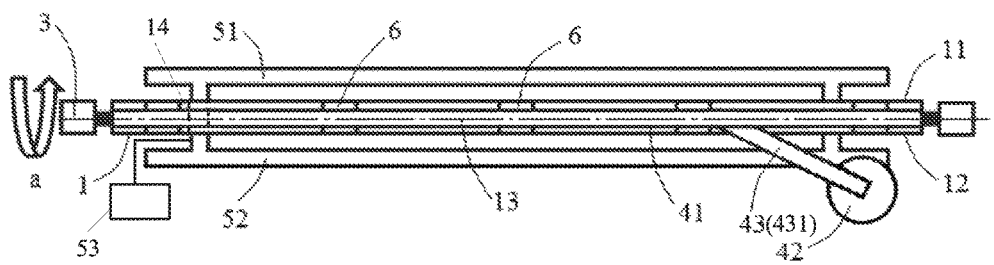
FIG. 2 is a side view of a laminator according to an embodiment of the present disclosure.
Figure 3:
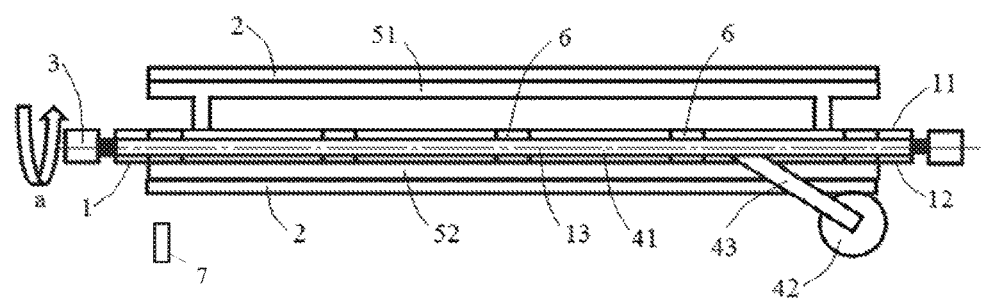
FIG. 3 is a schematic diagram of simultaneously laminating a film and sucking or releasing a borne object by a laminator according to an embodiment of the present invention.

In order to solve the above problem, referring to FIGS. 1 to 3, an embodiment of the present disclosure provides a laminator. The laminator includes a turnover abutment 1 and a film laminating device 4. The turnover abutment 1 includes a first surface 11 and a second surface 12 opposite to each other, and at least one of the first surface 11 and the second surface 12 is a bearing surface on which a plurality of suction structures 111 are provided. The plurality of suction structures 111 are used for sucking a borne object 2 (e.g., a glass substrate) onto the bearing surface. The film laminating device 4 is used for laminating a film on the borne object 2 on the bearing surface.

In the laminator provided by the embodiment of the present disclosure, the turnover abutment 1 includes the first surface 11 and the second surface 12 opposite to each other, and at least one of the first surface 11 and the second surface 12 is a bearing surface on which a plurality of suction structures 111 are provided. The plurality of suction structures 111 are used for sucking the borne object 2 onto the bearing surface, and the film laminating device 4 is used for laminating a film on the borne object 2 on the bearing surface. Therefore, if the bearing surface is used to receive the borne object 2, the turnover abutment 1 may be driven to turn over to allow the bearing surface to face up. The plurality of suction structures on the bearing surface then suck the borne object 2 from up to down. In this way, the borne object 2 will come into contact with all of the plurality of the suction structures due to the gravity even if the borne object 2 is inclined, and the problem that the borne object 2 is not sucked by some suction structures may be thus avoided. After the borne object 2 is sucked by the plurality of the suction structures, the turnover abutment 1 is driven to turn over again so that the borne object 2 is located on the underside of the turnover abutment 1. A film is then laminated on the borne object 2 by the film laminating device 4. At the end of film lamination, the turnover abutment 1 is driven to turn over again so that the borne object 2 is located on the upside of turnover abutment 1, and then the borne object 2 is released. Since the face-up model is employed during the suction and release of the borne object 2, the problem that the borne object is not sucked by some suction structures may be avoided, and the problem of a falling-off risk may be thus solved.

In an embodiment of the present disclosure, both of the first surface 11 and the second surface 12 are bearing surfaces. Therefore, after the first surface 11 have sucked the borne object 2 from top to bottom, the first surface 11 is turned over to face down for film laminating process, and at same time, the second surface 12 rightly faces up, and thus may simultaneously suck another borne object 2. When the film is laminated on the borne object 2 on the first surface 11, the second surface 12 also completes the suction of the borne object 2. In turn, the turnover abutment 1 is turned over to allow the first surface 11 to face up to release the borne object 2, so that the second surface 12 faces down for film laminating process. Thus, the suction or release of the borne object 2 and the film lamination may be performed simultaneously, and a tact time may be shortened greatly.

In an embodiment of the present disclosure, in order to take up and down the borne object 2 by a manipulator, with reference to FIGS. 2 and 3, a mounting chamber 14 running through the two bearing surfaces is provided within the turnover abutment 1. A support member 5 is provided within the mounting chamber 14. The support member 5 includes a first support portion 51 and a second support portion 52 which are used for supporting the borne objects 2 on the two bearing surfaces in one-to-one correspondence. The support member 5 is connected to a first servo motor 53 for driving the support member 5 to move so that the first support portion 51 and the second support portion 52 can respectively protrude from a corresponding bearing surface of the two bearing surfaces or return back to the mounting chamber 14. Therefore, during the suction of the bone object 2, the support member 5 may be firstly driven to move up by the first servo motor 53 so that a support portion of the first support portion 51 and the second support portion 52, which is located above of the support member 5, protrudes from a bearing surface of the two bearing surfaces facing up. Then, the borne object 2 is placed on this support portion by the manipulator, and the manipulator is drawn out between the borne object 2 and the turnover abutment 1 after the borne object is placed. Finally, the support member 5 is driven to move down by the first servo motor 53 until the support portion located above of the support member returns back to the mounting chamber 14, so that the borne object 2 falls onto the bearing surface facing up. During the release of the borne object 2, the support member 5 may be firstly driven to move up by the first servo motor 53 so that the support portion located above of the support member 5 protrudes from the bearing surface facing up, so that the borne object 2 on the bearing surface is jacked up to separate the borne object 2 from this bearing surface. Then, the manipulator extends between the borne object 2 and the bearing surface and then takes out the borne object 2. Therefore, the borne object 2 may be taken up and down by the manipulator.

In an embodiment of the present disclosure, as shown in FIG. 1, each of the first support portion 51 and the second support portion 52 includes a plurality of support bars A, and the plurality of support bars A are connected together. The borne object 2 is supported by the plurality of support bars A, so that compared with support pins, the contact area with the borne object 2 may be increased, and force bearing points may be more dispersed. The wider the plurality of support bars A are, the more dispersed the force bearing points are, so that a mura may be reduced.

In an embodiment of the present disclosure, in order to reduce a floor space of the laminator, with reference to FIGS.

1 to 3, the laminator 4 includes at least one slide rail 41, a roller 42 and at least one connector 43. Film material 44 is rolled on the roller 42. One end of a connector of the at least one connector 43 is rotatably connected to the roller 42, while the other end thereof is in sliding fit with a corresponding slide rail of the at least one slide rail 41. As the connector 43 slides within the slide rail 41, the roller 42 may roll on the borne object 2 on the bearing surface so that the film material 44 is attached onto the borne object 2. Since the film material is rolled on the roller 42, a space may be saved in comparison to unfolded planar film material. Accordingly, the size of the laminator may be decreased, and the floor space of the laminator may be reduced.

In an embodiment of the present disclosure, with reference to FIGS. 1 and 2, the at least one slide rail 41 includes two slide rails which are parallel to each other and arranged on two sides of the turnover abutment 1, respectively. The at least one connector 43 includes two connecting rods 431, and the two connecting rods 431 connect two ends of the roller 42 to the two slide rails 41 in one-to-one correspondence. Therefore, on one hand, a stability of a rolling of the roller 42 on the borne object 2 may be improved and the film material 44 may be better attached onto the borne object 2; one the other hand, the at least one slide rail 41 may be prevented from occupying a space below the turnover abutment 1, and the space occupied by the laminator in a height direction may be reduced.

In an embodiment of the present disclosure, the laminator further includes a cutting device 7 for cutting the film material 44, for example, a laser cutting device or a cutter wheel. When the roller 42 rolls a certain distance, the film material 44 may be cut off by the laser cutting device or the cutter wheel. In this embodiment, the specific position of the cutting device 7 is not limited as long as the film material 44 can be cut off.

In an embodiment of the present disclosure, at least one electromagnetic device 6 for generating a magnetic force is provided within the turnover abutment 1. Therefore, during the lamination of a metal film or film material 44 with a metal element, the at least one electromagnetic device 6 will be activated, and the at least one electromagnetic device 6 is powered on until the borne object 2 is discharged. The magnetic force generated by the at least one electromagnetic device 6 can suck the metal film or the film material 44 with a metal element, so that the film material 44 may be better attached onto the borne object 2. Accordingly, a problem of warping due to non-tight lamination of edges of the film material 44 may be avoided.

In an embodiment of the present disclosure, the at least one electromagnetic device 6 includes a plurality of electromagnetic devices 6 extending in a direction perpendicular to a spindle 13 of the turnover abutment 1, and the plurality of electromagnetic devices 6 are uniformly arranged within the turnover abutment 1 in an extension direction of the spindle 13 of the turnover abutment 1. Therefore, different positions on the metal film or the film material 44 with a metal element may be sucked, so that an attachment effect of the film material 44 may be further improved.

In order to save manpower, in an embodiment of the present disclosure, as shown in FIG. 2, the turnover abutment 1 is connected to a second driving device 3 for driving the turnover abutment 1 to turn over, as shown in an arrow a. The second driving device 3 may be a servo motor. An output shaft of the servo motor is connected to the spindle 13 of the turnover abutment 1, and the servo motor is located on one side of the turnover abutment 1.

In an embodiment of the present disclosure, as shown in FIG. 1, the plurality of suction structures 111 are suction holes 111 formed on the bearing holes. Accordingly, an increase in material may be avoided, and the cost may be reduced. It is to be noted that, a vacuum generator is connected to the suction holes 111. When the vacuum generator is activated, the borne object may be sucked on the bearing surface by the suction holes 111.

The film material 44 is for example a packaging film and/or a metal film. That is, the film material 44 may be rolled material formed by a packaging film and a metal film, or rolled material formed by a single packaging film or a single metal film. The film material 44 may be selected according to process requirements.

The foregoing descriptions merely show specific implementations of the present disclosure, but the protection scope of the present disclosure is not limited thereto. Any person of skill in the art may easily conceive of variations or replacements within the technical scope disclosed by the present disclosure, and these variations or replacements shall fall into the protection scope of the present disclosure. Therefore, the protection scope of the present disclosure shall be subject to the protection scope of the claims.

What is claimed is:

1. A laminator, comprising:
    a turnover abutment comprising a first surface and a second surface opposite to each other, the first surface and the second surface being bearing surfaces on each of which a plurality of suction structures are provided, the plurality of suction structures being used for sucking a borne object onto the bearing surface; and
    a film laminating device configured to laminate a film on the borne object on one of the bearing surfaces, wherein the turnover abutment includes:
    a mounting chamber running through the two bearing surfaces; and
    a support member provided within the mounting chamber, wherein the support member is connected to a first servo motor, and the support member includes a first support portion and a second support portion, each of the first support portion and the second support portion is configured to, driven by the first servo motor, protrude from a corresponding bearing surface of the two bearing surfaces to support a corresponding borne object or return back to the mounting chamber.

2. The laminator according to claim 1, wherein, each of the first support portion and the second support portion comprises a plurality of support bars parallel to each of the two bearing surfaces, and the plurality of support bars are connected together.

3. The laminator according to claim 1, wherein, the film laminating device comprises at least one slide rail, a roller and at least one connector; film material is rolled on the roller; one end of a connector of the at least one connector is rotatably connected to the roller, while the other end thereof is in sliding fit with a corresponding slide rail of the at least one slide rail; as the connector slides within the corresponding slide rail, the roller can roll on the borne object on the bearing surface so that the film material is attached onto the borne object.

4. The laminator according to claim 3, wherein, the at least one slide rail comprises two slide rails which are parallel to each other and arranged on two sides of the turnover abutment, respectively; and, the at least one connector comprises two connecting rods, and the two connecting rods connect two ends of the roller to two slide rails in one-to-one correspondence.

5. The laminator according to claim 3, further comprising a cutting device for cutting the film material.

6. The laminator according to claim 1, wherein, at least one electromagnetic device for generating a magnetic force is provided within the turnover abutment.

7. The laminator according to claim 6, wherein, the at least one electromagnetic device comprises a plurality of electromagnetic devices extending in a direction perpendicular to a spindle of the turnover abutment, and the plurality of electromagnetic devices are uniformly arranged within the turnover abutment in an extension direction of the spindle of the turnover abutment.

8. The laminator according to claim 1, wherein, the turnover abutment is connected to a driving device for driving the turnover abutment to turn over.

9. The laminator according to claim 1, wherein, the plurality of suction structures are suction holes.

10. The laminator according to claim 1, wherein, the borne object is a substrate.

11. The laminator according to claim 3, wherein, the film material is a packaging film and/or a metal film.

\* \* \* \* \*